350-422    SR
OR  3,604,786

United States

| | | | [11] 3,604,786 |
|---|---|---|---|

[72] Inventor James G. Baker
Winchester, Mass.
[21] Appl. No. 843,707
[22] Filed July 22, 1969
[45] Patented Sept. 14, 1971
[73] Assignee Polaroid Corporation
Cambridge, Mass.

[54] COMPACT AFOCAL MAGNIFYING LENS
14 Claims, 5 Drawing Figs.
[52] U.S. Cl. ................................................ 350/212,
350/189
[51] Int. Cl. ................................................ G02b 3/02,
G02b 3/04
[50] Field of Search .......................................... 350/189,
212

[56] References Cited
UNITED STATES PATENTS
2,100,291  11/1937  Lee .................... 350/189
2,544,413  3/1951  Bouwers ............... 350/189
3,059,532  10/1962  Harris et al. ............ 350/212
3,074,317  1/1963  Cox et al. .............. 350/212 X FOREIGN PATENTS
863,565  3/1961  Great Britain .......... 350/212

*Primary Examiner*—David Schonberg
*Assistant Examiner*—Paul A. Sacher
*Attorneys*—Brown and Mikulka, William D. Roberson and Frederick H. Brustman ABSTRACT: Compact six-element afocal magnifying lenses suitable for use as attachments to photographic objective lenses are described. The overall length of an afocal lens designed according to this invention is less than the focal length of the photographic objective lens with which it is to be associated. Magnifications as high as 2 power are attainable. Three elements are arranged in a positive front group, separated by a large air space from the other three elements which are arranged in a negative rear group. The outer elements in each group of three have higher Abbe values than the inner element of their respective group. High refractive indices are employed in the negative elements and moderate refractive indices in the positive elements. Chromatic and spherical aberrations, coma, astigmatism, field curvature, and distortion can be corrected. An aspheric surface is used.

PATENTED SEP 14 1971

3,604,786

| LENS | $n_d$ | $V_d$ | RADII | THICKNESSES & SPACINGS | |
|---|---|---|---|---|---|
| I | 1.58913 | 61.27 | $R_1$ = 0.4563<br>$R_2$ = -0.5814* | $T_1$ = 0.1692<br>$T_2$ = 0.0205 | |
| II | 1.68273 | 44.50 | $R_3$ = 0.7861 | | $S_1$ = 0.0053 |
| III | 1.49782 | 66.95 | $R_4$ = 0.4530<br>$R_5$ = 1.7911 | $T_3$ = 0.0634 | $S_2$ = 0.2309 |
| IV | 1.74400 | 44.77 | $R_6$ = 1.7624<br>$R_7$ = 0.2473 | $T_4$ = 0.0148 | $S_3$ = 0.0730 |
| V | 1.60342 | 38.03 | $R_8$ = 0.2513<br>$R_9$ = -0.2166 | $T_5$ = 0.0423<br>$T_6$ = 0.0106 | |
| VI | 1.74400 | 44.77 | $R_{10}$ = 0.6912 | | $S_4$ = 0.0687 |

*VERTEX RADIUS OF ASPHERIC CURVE

INVENTOR.
JAMES G. BAKER

BY Brown and Mikulka
and
Frederick H. Brustman
ATTORNEYS

PATENTED SEP 14 1971
3,604,786
SHEET 2 OF 2
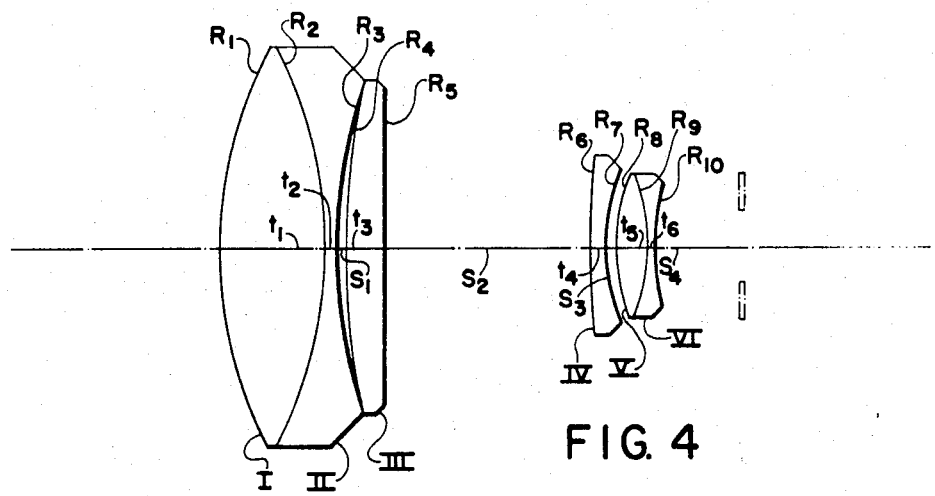
FIG. 4
| LENS | $n_d$ | $V_d$ | RADII | THICKNESSES & SPACINGS |
|------|-------|-------|-------|------------------------|
| I    | 1.58913 | 61.27 | $R_1 = 0.4540$<br>$R_2 = -0.5531$* | $T_1 = 0.1713$<br>$T_2 = 0.0184$ |
| II   | 1.68273 | 44.50 | $R_3 = 0.6819$ | $S_1 = 0.0053$ |
| III  | 1.49782 | 66.95 | $R_4 = 0.7533$<br>$R_5 = 3.633$ | $T_3 = 0.0634$<br>$S_2 = 0.3594$ |
| IV   | 1.74400 | 44.77 | $R_6 = 1.1744$<br>$R_7 = 0.1976$ | $T_4 = 0.0148$<br>$S_3 = 0.0117$ |
| V    | 1.60342 | 38.03 | $R_8 = 0.1982$<br>$R_9 = -0.1865$ | $T_5 = 0.0444$<br>$T_6 = 0.0085$ |
| VI   | 1.74400 | 44.77 | $R_{10} = 1.0820$ | $S_4 = 0.0560$ |
*VERTEX RADIUS OF ASPHERIC CURVE
FIG. 5
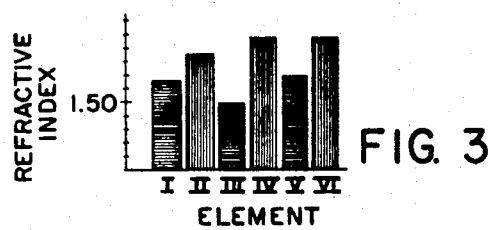
FIG. 3
INVENTOR.
JAMES G. BAKER
BY
Brown and Mikulka
and
Frederick H. Brustman
ATTORNEYS 3,604,786

1

COMPACT AFOCAL MAGNIFYING LENS

BACKGROUND OF THE INVENTION

The versatility of photographic cameras can be expanded with the use of auxiliary lenses. These auxiliary lenses generally are designed as attachments intended to fit in front of photographic objectives. One class of the lens attachments conventionally referred to as a "telephoto lens," serves to magnify an image to be recorded. It is preferred that the magnifying attachment have no adverse effect on the performance of the associated objective lens except to increase its effective focal length thereby magnifying the image. For instance, magnifying attachments should not introduce vignetting or reduce the $f$/number of the associated photographic objective. An auxiliary magnifying attachment should not reduce the overall optical performance of the associated objective, particularly with regard to chromatic and monochromatic aberrations. It should be simple and convenient to use.

As the attachment's magnification increases it becomes more difficult to properly correct for monochromatic and chromatic aberrations. Vignetting also becomes a problem at higher magnification. Presently the art knows few, if any, well corrected attachments with a magnifying power sufficient to double the size of the image formed by the associated objective. Relatively large and heavy magnifying attachments with powers up to 1.8X are known. In general, however, these magnifiers exhibit distortion and curvature of field. This has been found to be especially troublesome in compact attachment lenses. Many magnifying attachments deteriorate the image quality of the objectives with which they are used. Designers, fearing defects to be inherent, have made the best of a poor situation by trying to use them to balance known defects in the objectives with which they are supposed to be used.

In general, magnifying attachments known to the prior art are relatively large and bulky in relation to the focal lengths of the objective lenses with which they are intended to be associated. A design for an afocal magnifying attachment, with a power as high as 2X, which is compact in relation to the focal length of the photographic objective for which it is intended has been considered difficult to achieve.

SUMMARY OF THE INVENTION

Among the principal objects of this invention are to provide:

an afocal magnifying lens of up to two power (2X);

an afocal magnifying lens which is compact and comparatively lightweight;

an afocal magnifying lens which is well corrected and suitable for use as a photographic lens attachment;

an afocal magnifying lens which does not deleteriously affect the chromatic and monochromatic corrections of an associated photographic objective.

These and other objectives of the invention are accomplished by a 6-element lens system. It is separated into a front convergent group and a rear divergent group. Each has three elements. A large air space is employed between the convergent and divergent groups. A marked alternation between moderate and high refractive indices in adjacent elements characterizes afocal magnifying lenses made according to this invention. The refractive index difference between adjacent elements is approximately 0.1 or greater. All the elements are fixed with respect to one another. Focusing is accomplished by whatever means the camera or its objective is provided with. A cemented aspheric surface is used to further the optical corrections.

The invention accordingly comprises a lens arrangement possessing the features, properties, and relation of elements which will be exemplified in the following detailed description of the lens and the scope of the application of which will be indicated in the claims.

2

DESCRIPTION OF THE DRAWINGS

For a fuller understanding of the nature and objects of the invention, reference should be had to the following detailed description taken in connection with the accompanying drawings wherein:

FIG. 3 is a chart illustrating the refractive index differences between adjacent elements of the lens shown in FIG. 1;

FIG. 4 is a cross-sectional view of another embodiment of a compact afocal magnifying lens according to this invention;

FIG. 5 gives constructional data, based on unit length, for the lens of FIG. 4.

DETAILED DESCRIPTION

Figures 1, 2:
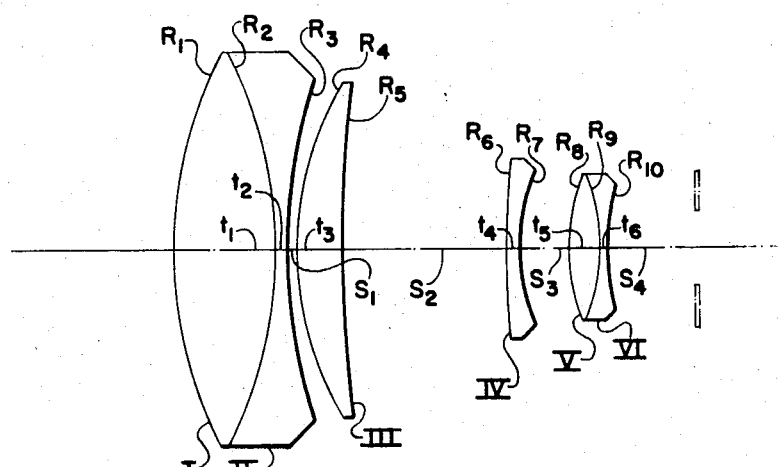
FIG. 1 is a cross-sectional view of a compact afocal magnifying lens according to this invention.
FIG. 2 gives constructional data, based on unit length, for the lens of FIG. 1.

Afocal magnifying lenses according to this invention are adaptable for use with a wide variety of objective lenses. These afocal magnifiers can be readily optimized for use with a specific lens. They are fully correctable for use with high quality objective lenses and therefore enjoy very broad application in the art. Powers as great as two times (2X) with good corrections for chromatic and monochromatic aberrations are possible.

The magnifying lens attachment is especially useful with objectives having relatively wide fields of view, up to 50°. This afocal magnifying lens is particularly suited for use with objectives having apertures between $f/6$ and $f/16$. Afocal lenses shown herein can be scaled in accordance with the focal length of an objective to be fitted.

An afocal magnifying lens does not bring parallel light rays to a common finite focus. Therefore, it has no finite focal length. Only angular relationships between light ray pencils emanating from separated points are changed by the afocal lens. In an afocal system both object and image planes and both front and rear focal points lie at infinity. Parallel light passing through the lens system emerges parallel. The only difference between the entrance and exit ray beams is in their relative cross sections. If an incoming beam of parallel light is, say, 50 mm. in diameter, and the emerging beam is only 25 mm. in diameter, the system is afocal, but has an angular magnification of 2X. Conservation of energy principles decree that the angular size of a small object seen anywhere in an afocal beam must be inverse to the corresponding cross section of the beam. If the cross section is smaller, the angular size is greater, i.e., magnified angularly.

Afocal magnifying lenses according to this invention work quite well with objective lenses having their real aperture stops in unusual locations. Since this magnifying lens is afocal, it can be scaled independently of the objective lens that follows. This in effect changes the relationship of the magnifying lens to the entrance pupil of the following objective lens. Aberrations tend to diminish as the present afocal magnifying lens is scaled-up. This is because the curvatures of the lens surfaces become less steep, but the distance to the image of the pupil, in the respective forward image spaces, is not changed appreciably. When one scales-up the lens, the center of curvature moves closer to the image of the pupil. The obliqueness of the refractions is decreased. Conversely, when the system is scaled to derive more compact versions the aberrations increase. By selective use of aspheric surfaces in the system, more direct correction for specific aberrations can be applied. Aspheric curvatures are particularly desirable for corrective purposes since they provide extra variables to use in the correction process without increasing the size or weight of the system. Reducing the overall size of a 2X magnifying lens, relative to unit length, beyond that in the examples set forth below results in over corrected versions requiring the use of several aspheric surfaces. However, much smaller versions of the system can be achieved using only a single aspheric surface at the expense of a very slight reduction in magnification.

Referring to FIG. 1, the magnifying lens system of the invention is characterized in having a converging front group containing elements I, II and III and a diverging rear group containing elements IV, V and VI. An air space which is at least 25 percent of the lens's overall length, separates the two groups. Doublets are used in both the converging and diverging groups, for instance elements I and II in the converging front group form a doublet as do elements V and VI in the diverging rear group. To achieve a well corrected compact design with power as high as 2X it has been found that an aspheric curve on one of the front doublet elements, I and II, is helpful. Placing the aspheric surface at the cemented interface of elements I and II yields certain advantages described below. Another characteristic of the lens system resides in the substantial refractive index differences between adjacent elements. The refractive indices of adjacent elements alternate between high and moderate values. This strong alternation is graphically illustrated in FIG. 3.

In the figures and in the tables below the radii of curvatures of the lens element surfaces, from left to right, are denoted by the symbols: $R_1$, $R_2$.... Thicknesses of the elements and air spaces are denoted by $t_1$, $t_2$...and $S_1$, $S_2$...also from left to right. Refractive indices for the 587.6 nm wavelength, are indicated by $n_d$ and the Abbe dispersion numbers by Y.

For convenience, the lens formulas given below and in FIGS. 2 and 5 are provided in terms of unit length. Species of this invention can be optimized for use with particular objective lenses. In such cases it is most convenient to make the magnifying lens' unit length equal to the objective's focal length. If the ratio of unit length to focal length represents a scaling factor significantly smaller than unity, image corners become badly vignetted and the aberrations uncontrollable. Where the lens is intended for use with an objective of much narrower field angle than suggested above dimunition in its size is practical. That is, the scaling factor can be significantly less than unity.

In conventional camera design it is preferred that focusing be accomplished by manipulation of components permanently mounted within the camera. It is desirable that this focusing technique be retained when lens attachments as now described are used with the basic lens system. The instant magnifying lens design provides for a retention of such desirable focusing, and imposes no requirement for orientation of its individual elements to achieve appropriate focusing. Investigation of the system has indicated that a rapid deterioration in lens performance accrues when its elements are moved for focusing purposes.

The compact characteristics of the present lens system are achieved as a result of a detailed treatment of the aberrations otherwise prevalent in magnification attachments. Aberrations will be seen to be accounted for through the development of appropriate surface curvatures, proper combinations of refractive properties and the judicious use of an aspheric element surface. These aspects of the design are treated in detail in the discussion to follow. For convenience, the discussion is arranged within two subtopics. Design for Optional Aberrations; and Use of Aspheric Surfaces.

DESIGN FOR OPTICAL ABERRATIONS

The afocal magnifying lenses of the present system are characterized by a strong alternating variation in refractive index between adjacent elements. The marked alternation of refractive indices is intended principally to control the flatness of the field. If large differences in index were not employed, the negative rear group of lenses would have to be considerably stronger and would dominate the corrections for field curvature. Therefore, it is desirable to have a refractive index difference between consecutive lens elements of at least 0.09.

The primary correction of chromatic aberrations in the magnifying attachment is performed by the doublets in the convergent and divergent groups.

In some prior art afocal lenses, advantage is taken of inadequacies in the photographic objective with which the attachment is intended to function. For example, if the photographic objective does not have a flat field, the field flatness of the attachment may be left partially uncorrected so long as it is opposite in sign. The combination may then be acceptable, while the attachment itself is poorly corrected for field flatness.

An advantage of this afocal magnifying lens is it can be used with any photographic objective which already has a substantially flat focal plane. The addition of the afocal magnifying lens does not cause any deterioration in the field flatness of the objective. To prevent the negative elements from dominating the correction for field curvature, the positive elements use a moderate index of refraction and the negative elements use a high index of refraction. Lateral and longitudinal chromatic color corrections of the afocal magnifying lens are controlled by proper choices of the Abbe dispersion number. Negative elements I, IV and VI possess substantially similar dispersion numbers of moderate value, in the examples given Y=45. Positive elements I and III in the front converging group, have Abbe dispersion numbers which are relatively high. Positive element V, in the rear diverging group, has a relatively low Abbe dispersion number.

High index materials for negative elements II, IV, VI and moderate index materials for positive elements I, III, V are used to flatten the field in the presence of the dominant negative curvatures associated with an afocal lens of up to 2 power. Flattening the field in a lens system dominated by negative curvatures is very difficult. Negative curvatures tend to promote undesired field curvature. Strong curves must be used in the front collective group to obtain a net positive effect therein despite the choice of refractive indices.

It is desirable to prevent individual light rays from being deviated too far before optical corrections have their effect. To this end the positive and negative elements are arranged in alternating order. Therefore, strongly alternating refractive indices, which is characteristic of this magnifying lens is a result of keeping other aberrations under control while flattening the field.

Cemented doublets permit the most effective chromatic optical corrections, particularly for lateral color.

Except for the cemented surfaces there is a general tendency throughout the system for the air surfaces to be curved around the aperture stop. This is important in providing a large field of view. The magnifier should conform to the objective lens design. Failure to do so results in a combination with poor performance, e.g., if the attachment doesn't use the same aperture stop location as the objective, very strong vignetting results. So it will not vignette the image, the attachment must be designed for an aperture stop positioned behind its rear surface in the objective. The size of the front element is determined by the position of the aperture stop and the field angle. As the field angle increases the front element must become larger and correcting optical aberrations more difficult in consequence of the increase in angle and number of the off axis light rays. The advantage of this invention is that it is well corrected for a relatively wide field angle and a rearwardly located aperture stop.

It should be noted how distortion has been controlled. The front doublet would normally contribute a very large amount of pincushion distortion. By reversing the refractive indices therein it is possible to minimize its distortive contribution. Only a dismissable amount of pincushion distortion remains. Element III has an appreciable amount of pincushion distortion stemming principally from the fifth surface of the system, $R_5$, its rear surface. The following element, IV, however, contributes a significant amount of barrel distortion. These two elements tend to balance each other and to balance out the system such that it is nearly free of distortion. The rear cemented doublet is, of itself, substantially distortion-free.

A large central air space, $S_2$, was found to be essential in separating the net powers of the positive and negative groups.

In the prior art the net powers of the positive and negative groups are separated by the use of rather large glass thicknesses. This design approach leads to a magnifying lens which is unacceptably heavy and bulky. Such lenses are not known to work well at 2 power either.

Element IV serves to perform a major correcting function for the astigmatism within the system. Element III does situation substantial amount of the correcting for coma. The general shape, that is the bending, of the elements serves to keep spherical aberration under control.

If the magnification required of the afocal attachment is diminished, to 1.8X, the optical aberrations become easier to correct. The size of the already compact attachment can be dramatically reduced if minor decreases in the magnification can be tolerated. Similarly, if the field of view is diminished, e.g., to 30°, the aberrations become easier to correct. The features which cause the greatest trouble in the design are the magnification, wide field angle, and aperture ratio.

USE OF ASPHERIC SURFACES

The goal of optical design is to simplify a complicated optical system so a mathematical model of it behaves like an idealized simple lens system of the same focal length, aperture and focus. Aberrations of higher order are eliminated or rendered harmless. Only the low order basic properties remain. As aperture size increases, image quality deteriorates very rapidly in a simple imaging system. Higher order aberration terms cause this deterioration. They can be rendered negligible in a lens system by using the design variables inherent in numerous surfaces and glass types, etc. to control extra axial light rays, and bundles of rays.

If the aberrations are not too have only spherical surfaces need be used. Usually, there are enough parameters and space in a lens barrel of reasonable size to permit a designer to eliminate or substantially reduce harmful aberrations. When aberrations are severe, more elements are required to add extra parameters for corrections. Often a limit is reached on the number of elements which can be added to the available space. Frequently, this is a problem only in a small section of the lens barrel where a particular correction must be made. It is in this situation that an aspheric surface is most useful. An aspheric correction has the highly desirable feature that it gets right at the cause of the trouble. It leads to controlled refraction in a very small space. An aspheric does not add to the transmission losses and generally does not complicate the space arrangements in the lens barrel.

An aspheric surface introduces extra parameters. A designer can use these parameters to correct far more aberrations. They measurably improved the optical performance in the outer image field.

Often, if additional spheric surfaces are introduced to reduce a bad aberration, rather strong curvatures must be used before the difference in the successive refractions can be put to work on the aberration in question. The strong curvatures introduce new troubles of other kinds. An aspheric surface in the proper place avoids this by changing the localized refractions without drastically upsetting the design elsewhere.

In the afocal magnifying lens attachment of this invention, the front group of elements is collective and the rear group divergent. The rear group effectively magnifies any aberrations in the front group and introduces more of its own. Accordingly, the front group must be very well corrected over the field for chromatic and spherical aberrations and the like. These corrections for the front group are not for that group standing by itself, but must be in conjunction with the rear group. If any one aberration is dominant in the front lens group, such as higher order coma, its effect must be toned down by the judicious use of the aspheric. Eliminating distortion in a basically unsymmetric lens system requires the use of strongly opposing refractions. These can be held in approximate balance for the chief rays across the field. They can become uncontrollable for all the other rays unless careful design is exercised. The necessity of having a well corrected convergent front group, because of the aberration magnifying property of the rear negative group, dictates that an aspheric surface be used. Using an aspheric means that the necessary degree of correction can be achieved without adding to the size or weight of the convergent group.

Surface $R_2$ has been chosen for the location of the aspheric curve within the converging group. Surfaces $R_1$ or $R_3$ might also have been used. The choice of surface $R_2$ is based, in part, on manufacturing advantages which can be had. $R_2$ is cemented surface. Therefore, the aspheric curve can be polished on either element I or II. They are then joined with a cement whose refractive index matches the element to which the aspheric surface is joined. Thus, only one surface need be properly made. Because $R_2$ is a cemented surface, the polishing tolerance for the aspheric curve can be loosened, perhaps six fold.

Ray refractions near the outer portions of a strong doublet such as elements I and II, involve prismatic dispersions of rays which are hard to recombine into white light later in the lens system. Recombination can be achieved locally, however, achieving it over a large field is difficult. The aspheric at $R_2$ helps to prevent strong refractions at the outer portions of the doublet. This is because the aspheric has a more gentle curve in those portions than a plain spherical surface would have.

The aspheric formula used in the design of the magnifying attachments of this invention is given below. It describes a surface of revolution in terms of a height $\xi$ above a plano reference surface at a distance $\rho$ from the axis of revolution. The axis of revolution is coaxial with the optic axis. Surface curvature at the vertex is expressed by $c$. It is the reciprocal of the vertex radius. Coefficients defining the aspheric curvature are $\beta$ and $\gamma$. Their values are determined by the intended effect of the aspheric surface on the off axis light rays.

$$\xi = \frac{c\rho^2}{1+\sqrt{1-c^2\rho^2}} + \beta\rho^4 + \gamma\rho^6$$

EXAMPLES

Examples One and Two set forth below represent compact afocal magnifying lenses, according to this invention, which are optimized for a particular objective lens. Such an objective lens described in Example E of my copending application for U.S. Pat. Ser. No. 774,141 filed Nov. 7, 1968. These two examples have a nominal magnifying power of 2X. The real stop of the objective lens, for which Examples One and Two are optimized is toward its rear and is shown in phantom in FIGS. 1 and 4.

While the two examples given herein have powers of 2X it is not necessary that magnifying lenses according to this invention have such comparatively high power. Compactness is an important feature of this invention. Examples One and Two are far more compact, measured by the focal length of the objective for which they are optimized, than previously known magnifying attachments. Magnifying lenses of less than 2 power, designed according to this invention are dramatically smaller. A compact magnifying lens, according to this invention and optimized for the same objective, of 1.8X is only one-fourth the volume of the 2X examples set forth here.

Values of refractive index $n$ and Abbe dispersion number Y are tabulated for light having a wavelength of 587.6 nm. Radii and thicknesses are tabulated in terms of unit length.

EXAMPLE ONE

This species possesses optimum optical correction for use with the aforementioned compact objective lens in recording subjects at a reciprocal object distance, in terms of unit length, of 0.1182. The attachment is illustrated in FIG. 1.

| Lens | $n_d$ | $V_d$ | Radii | Thicknesses and spacings |
|---|---|---|---|---|
| I | 1.58913 | 61.27 | $R_1 = 0.4563$ | $T_1 = 0.1692$ |
|   |         |       | $R_2 = -0.5814$ | $T_2 = 0.0205$ |
| II | 1.68273 | 44.50 | $R_3 = 0.7861$ | $S_1 = 0.0053$ |
|   |         |       | $R_4 = 0.4530$ | $T_3 = 0.0634$ |
| III | 1.49782 | 66.95 | $R_5 = 1.7911$ | $S_2 = 0.2309$ |
|   |         |       | $R_6 = 1.7624$ | $T_4 = 0.0148$ |
| IV | 1.74400 | 44.77 | $R_7 = 0.2473$ | $S_3 = 0.0730$ |
|   |         |       | $R_8 = 0.2513$ | $T_5 = 0.0423$ |
| V | 1.60342 | 38.03 | $R_9 = -0.2166$ | $T_6 = 0.0106$ |
| VI | 1.74400 | 44.77 | $R_{10} = 0.6912$ | $S_4 = 0.0687$ |

The number given for the radii of surface $R_2$ is its vertex radius. Surface $R_2$ is aspheric and is formed in accordance with the formula given above. Values for the constants in the formula for this species are $\beta = 2.449030$ and $\gamma = -0.784120$.

EXAMPLE TWO

This species is optimized for use with the aforementioned objective to record subjects at a reciprocal objective distance of 0.0591, in terms of unit length. A sketch of this species of afocal magnifying attachment is shown in FIG. 4.

| Lens | $n_d$ | $V_d$ | Radii | Thicknesses and spacings |
|---|---|---|---|---|
| I | 1.58913 | 61.27 | $R_1 = 0.4540$ | $T_1 = 0.1713$ |
|   |         |       | $R_2 = -0.5531$ | $T_2 = 0.0184$ |
| II | 1.68273 | 44.50 | $R_3 = 0.6819$ | $S_1 = 0.0053$ |
|   |         |       | $R_4 = 0.7533$ | $T_3 = 0.0634$ |
| III | 1.49782 | 66.95 | $R_5 = 3.633$ | $S_2 = 0.3594$ |
|   |         |       | $R_6 = 1.1744$ | $T_4 = 0.0148$ |
| IV | 1.74400 | 44.77 | $R_7 = 0.1976$ | $S_3 = 0.0117$ |
|   |         |       | $R_8 = 0.1982$ | $T_5 = 0.0444$ |
| V | 1.60342 | 38.03 | $R_9 = -0.1865$ | $T_6 = 0.0085$ |
| VI | 1.74400 | 44.77 | $R_{10} = 1.0820$ | $S_4 = 0.0560$ |

Constants for substitution into the aspheric formula given above are $\beta = 2.569212$ and $\gamma = -1.017325$.

Those skilled in the art will understand that each species of the invention works best in the particular situation it is intended for.

Each magnifying attachment according to this invention, can possess minor variations to fit it for a particular use without departing from the basic principles set forth herein. For every specific task, there is a specific optimization. The range of optimization does not have to be very great in external terms. Since this compact afocal magnifying lens has large internal powers, and is asymmetric, in practice reoptimization would likely mean some changes in glass types. There are not changes in the principles involved.

It should be noted that both examples have the large central air space discussed above. Another characteristic appearing in these examples, and which was discussed above, is the distinct alternating arrangement of high and moderate refractive indices in successive elements.

Although reference is made to the use of glasses with specific properties for constructing the afocal magnifying lens of this invention, it is to be understood that other glasses and transparent materials, including plastics, can be used.

Since certain changes may be made in the above afocal magnifying attachment without departing from the scope of the invention herein involved, it is intended that all matter contained in the above description or shown in the accompanying drawings shall be interpreted as illustrative and not in a limiting sense.

What is claimed is:

1. A compact magnifying lens for use with a photographic objective comprising:
    a front converging group of elements including a positive biconvex first element, a negative biconcave second element with a refractive index substantially higher than that of said first element, and a positive third element having a refractive index substantially lower than that of said second element; and
    a rear diverging group of elements containing a negative fourth element having a refractive index substantially higher than that of said third element, a positive biconvex fifth element having a refractive index substantially lower than that of said fourth element, and a negative biconcave sixth element having a refractive index substantially higher than that of said fifth element; said magnifying lens being afocal and having an overall length less than the focal length of said photographic objective.

2. The compact afocal magnifying lens of claim 1 wherein said converging group and said diverging group are separated by a central air space having a thickness at least one-quarter of the overall length of said afocal lens.

3. The compact afocal magnifying lens of claim 1 wherein said first and second elements are joined as a doublet and said fifth and sixth elements are joined as a doublet.

4. The compact afocal magnifying lens of claim 1 wherein at least one surface of said first and second elements has an aspheric curvature.

5. The compact afocal magnifying lens of claim 4 wherein the first and second elements are cemented together and at least one surface at the cemented interface between said first and said second elements is aspheric.

6. The compact afocal magnifying lens of claim 1 wherein the Abbe dispersion numbers of said second, fourth and sixth elements are substantially equal, the Abbe dispersion numbers of said first and third elements are higher than those of said second, fourth and sixth elements and the Abbe dispersion number of said fifth element is lower than those of said second, fourth and sixth elements.

7. A compact magnifying lens for use with a photographic objective comprising:
    a front converging group of elements including a positive biconvex first element, a negative biconcave second element and a positive third element;
    a rear diverging group of elements including a negative fourth element, a positive biconvex fifth element and a negative biconcave sixth element;
    said magnifying lens being afocal and having an overall length less than the focal length of said photographic objective with said positive group and said negative group being separated by a central air space having a thickness of at least one-fourth of the overall length of said magnifying lens.

8. The compact afocal magnifying lens of claim 7 wherein at least one element surface has an aspheric curvature.

9. The compact afocal magnifying lens of claim 8 wherein said aspheric surface is in said front positive group.

10. The compact afocal magnifying lens of claim 9 wherein the first and second elements are cemented together and at least one surface at the cemented interface between said first and second elements is aspheric.

11. The compact afocal magnifying lens of claim 10 wherein said aspheric surface curvature is determined according to the formula:

$$\xi = \frac{c\rho^2}{1 + \sqrt{1 - c^2\rho^2}} + \beta\rho^4 + \gamma\rho^6$$

$\xi$ represents the aspheric surface height above a plane reference surface;
$c$ is the reciprocal of the radius at the optic axis;
$\rho$ is the radial distance from the optic axis;

$\beta$ and $\gamma$ are constants determined by the optical optimization desired.

12. The compact afocal magnifying lens of claim 7 wherein the Abbe dispersion numbers of said negative second, fourth and sixth elements are substantially equal to each other, the Abbe numbers of said positive first and third elements are greater than those of said negative elements and the Abbe number of said positive fifth element is lower than those of said negative elements.

13. The compact afocal magnifying lens of claim 1 conforming to the following design parameters, scaled to a unit length,

| Lens | $n_d$ | $V_d$ | Radii | Thicknesses and spacings |
|---|---|---|---|---|
| I | 1.58913 | 61.27 | $R_1=0.4540$ | $T_1=0.1713$ |
| II | 1.68273 | 44.50 | $R_2=-0.5531$ | $T_2=0.0184$ |
|   |         |       | $R_3=0.6819$ | $S_1=0.0053$ |
| III | 1.49782 | 66.95 | $R_4=0.7533$ | $T_3=0.0634$ |
|   |         |       | $R_5=3.633$ | $S_2=0.3594$ |
| IV | 1.74400 | 44.77 | $R_6=1.1744$ | $T_4=0.0148$ |
|   |         |       | $R_7=0.1976$ | $S_3=0.0117$ |
| V | 1.60342 | 38.03 | $R_8=0.1982$ | $T_5=0.0444$ |
|   |         |       | $R_9=-0.1865$ | $T_6=0.0085$ |
| VI | 1.74400 | 44.77 | $R_{10}=1.0820$ | $S_4=0.0560$ | wherein the lens elements are identified by the numerals I to VI in order from front to rear; $n_d$ is the refractive index for the 587.6 nm wavelength of the spectrum; $V_d$ is the Abbe dispersion value; $R_1$ and $R_3$ through $R_{10}$ represent the radii of curvature of the lens element surfaces from front to rear; $R_2$ represents the vertex radius of an aspheric surface according to the formula $$\xi = \frac{c\rho^2}{1+\sqrt{1-c^2\rho^2}} + 2.569212\rho^4 - 1.017325\rho^6$$

$\xi$ is the aspheric surface height from a plano reference surface; $\rho$ is the radial zone distance from the lens axis; and $c$ is the reciprocal of $R_2$.

14. The compact afocal magnifying lens of claim 1 conforming to the following design parameters, scaled to a unit length,

| Lens | $n_d$ | $V_d$ | Radii | Thicknesses and spacings |
|---|---|---|---|---|
| I | 1.58913 | 61.27 | $R_1=0.4563$ | $T_1=0.1692$ |
| II | 1.68273 | 44.50 | $R_2=-0.5814$ | $T_2=0.0205$ |
|   |         |       | $R_3=0.7861$ | $S_1=0.0053$ |
| III | 1.49782 | 66.95 | $R_4=0.4530$ | $T_3=0.0634$ |
|   |         |       | $R_5=1.7911$ | $S_2=0.2309$ |
| IV | 1.74400 | 44.77 | $R_6=1.7624$ | $T_4=0.0148$ |
|   |         |       | $R_7=0.2473$ | $S_3=0.0730$ |
| V | 1.60342 | 38.03 | $R_8=0.2513$ | $T_5=0.0423$ |
|   |         |       | $R_9=-0.2166$ | $T_6=0.0106$ |
| VI | 1.74400 | 44.77 | $R_{10}=0.6912$ | $S_4=0.0687$ | wherein the lens elements are identified by the numerals I to VI in order from front to rear; $n_d$ is the refractive index for the 587.6 nm wavelength of the spectrum; $V_d$ is the Abbe dispersion value; $R_1$ and $R_3$ through $R_{10}$ represent the radii of curvature of the lens element surfaces from front to rear; $R_2$ represents the vertex radius of an aspheric surface according to the formula $$\xi = \frac{c\rho^2}{1+\sqrt{1-c^2\rho^2}} + 2.449030\rho^4 - 0.784120\rho^6$$

$\xi$ is the aspheric surface height from a plano reference surface; $\rho$ is the radial zone distance from the lens axis; and $c$ is the reciprocal of $R_2$.